United States Patent [19]

Massey et al.

[11] Patent Number: 4,727,899

[45] Date of Patent: Mar. 1, 1988

[54] PILOT VALVE ASSEMBLY

[75] Inventors: Roger G. Massey, Exeter; David G. Holloway, Concord, both of N.H.

[73] Assignee: Parker & Harper Manufacturing Company, Inc., Worcester, Mass.

[21] Appl. No.: 919,478

[22] Filed: Oct. 16, 1986

[51] Int. Cl.[4] .......................................... F15B 13/044
[52] U.S. Cl. ........................................ 137/270; 91/54;
  137/551; 137/596.17; 137/625.64; 137/884;
  251/29; 251/30.01; 251/129.03
[58] Field of Search .................... 137/270, 625.64, 551,
  137/596.17, 884; 251/30.01, 29, 129.03; 91/54;
  285/133.1

[56] References Cited

U.S. PATENT DOCUMENTS

| | | | |
|---|---|---|---|
| 2,799,293 | 7/1957 | Clay | 137/596.17 |
| 2,881,801 | 4/1959 | McCormick | 137/270 X |
| 3,236,494 | 2/1966 | Frantz | 251/129.03 |
| 3,347,260 | 10/1967 | Lewis et al. | 137/625.48 X |
| 3,522,821 | 8/1970 | Komendera | 137/625.64 X |
| 3,678,810 | 7/1972 | Holmes et al. | 285/133.1 X |
| 4,193,423 | 3/1980 | Stoll et al. | 251/129.03 X |
| 4,348,942 | 9/1982 | Stoll | 137/884 X |
| 4,501,299 | 2/1985 | Klimowicz et al. | 137/625.65 |
| 4,507,707 | 3/1985 | Willis | 137/884 X |
| 4,598,736 | 7/1986 | Chorkey | 137/270 X |
| 4,633,897 | 1/1987 | Effenberger | 251/58 X |

FOREIGN PATENT DOCUMENTS

WO83/02811  8/1983  PCT Int'l Appl. ................ 137/844

Primary Examiner—Gerald A. Michalsky
Attorney, Agent, or Firm—Thomas N. Tarrant

[57] ABSTRACT

A pilot valve for connecting a source of fluid under pressure to an actuator where the pilot valve may be connected to the actuator in any of 360° of rotation so that the fluid connections may be made from any desired direction. Further disclosed is a coupling adapter joining the pilot valve to the actuator with passages so arranged in the adapter that 180° rotation of the coupling adapter reverses the fluid flow connections between the pilot valve and the actuator simultaneously exposing indicia indicating the condition. Still further disclosed is a spring return manual override that is slotted to enable operation by a coin and has a mating slot in the pilot valve body allowing locking in the override position by insertion of a coin or similar device. A ball valve actuator is described as an actuator device.

6 Claims, 4 Drawing Figures

PILOT VALVE ASSEMBLY

BRIEF SUMMARY OF THE INVENTION

The present invention relates to fluid pressure driven actuators and in particular to pilot valve assemblies for controlling such actuators. A solenoid operated pilot valve assembly is provided that interfaces with a driven actuator with concentric channels in the plane of the interface allowing 360° rotation of the pilot valve assembly relative to the driven actuator whereby pressure and exhaust lines can be connected by the shortest and most convenient paths. Additional features include a coupling adapter with apertures arranged so that 180° rotation of the adapter reverses the pressure and exhaust connections and reveals indicia of the state of orientation; and a slotted manual override with corresponding slots in the pilot valve assembly body allowing latching in the manual override position by a coin or other than rigid article.

DESCRIPTION OF THE PREFERRED EMBODIMENTS

Figure 4:
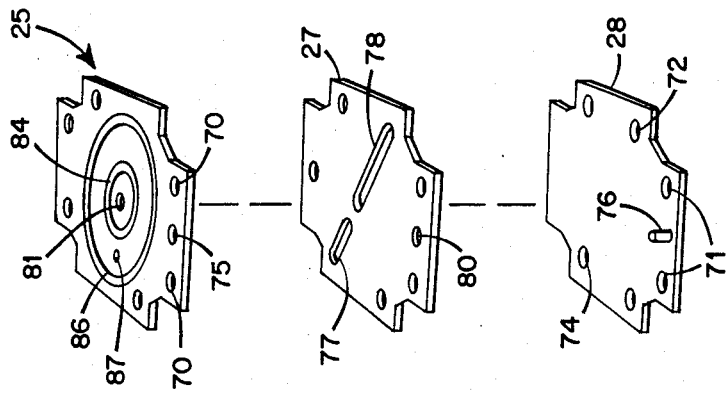
FIG. 4 is an exploded diagram of a coupling interface according to the invention.

The present invention was conceived in designing actuators for ball valves and thus the following description is directed to a pilot valve assembly controlling a ball valve actuator. The present pilot valve assembly is useful with pnematic and other fluid actuators driving various kinds of valves and other devices. The basic solenoid operated pilot valve is well known in the art and a diagram of one can be found in U. S. Pat. No. 3,107,080 to W. K. Priese where it is depicted in FIG. 4 and described as a four way reversing valve.

Figure 1:
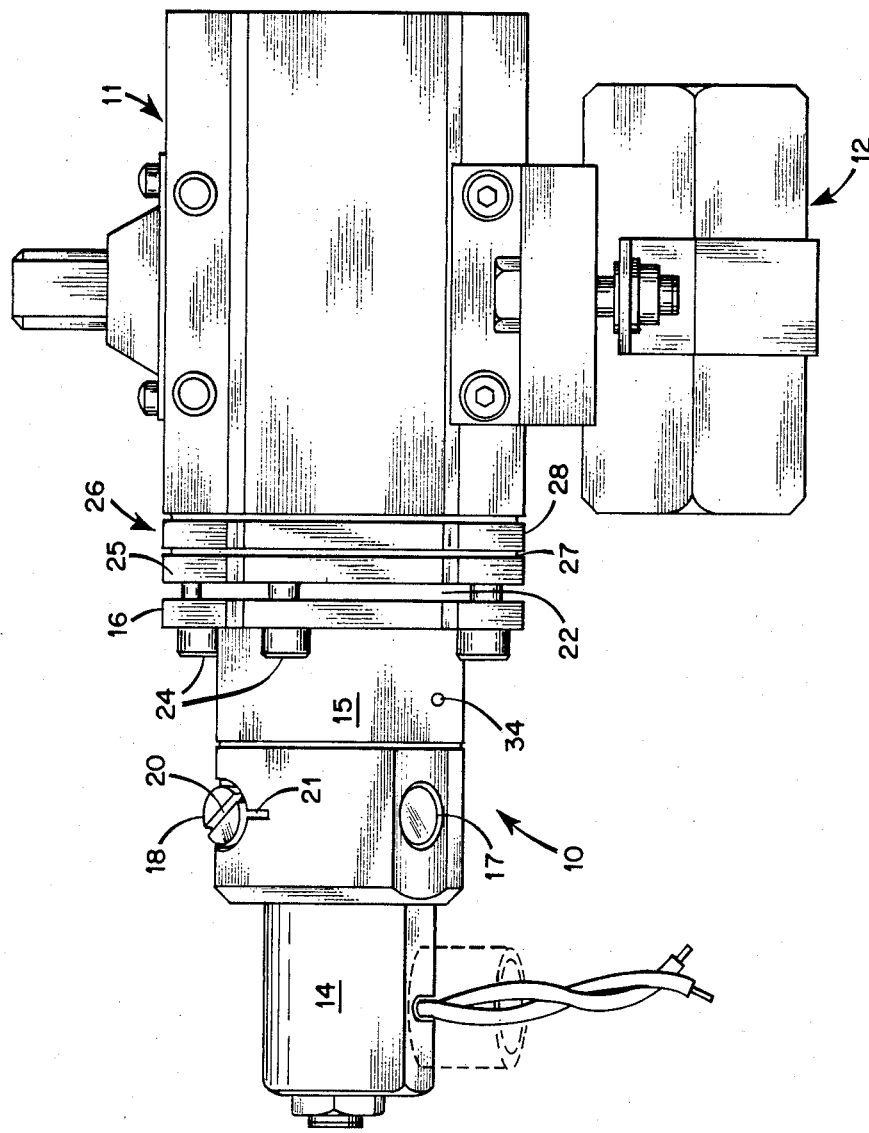
FIG. 1 is a front elevation of a power actuated valve assembly with a pilot valve assembly according to the invention.
Figure 2:
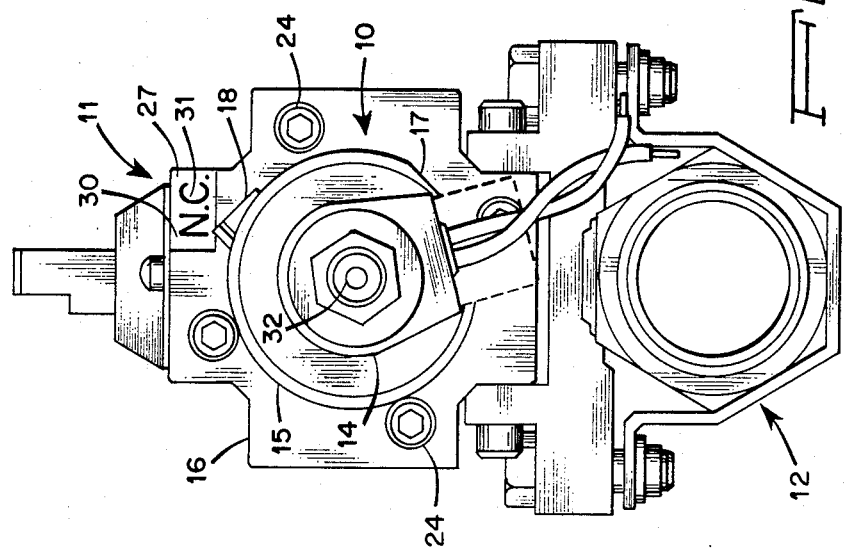
FIG. 2 is a left end elevation of the assembly of FIG. 1.

FIGS. 1 and 2 show pilot valve assembly 10 connected to actuator 11 which in turn is secured to ball valve assembly 12. Pilot valve assembly 10 consists of solenoid 14, pilot valve body 15 and retainer plate 16. Threaded inlet 17 in body 15 provides for connection of a fluid pressure source such as air under pressure. Screw 18 in body 15 is a manual override control. A cam on the end of screw 18 contacts the armature of solenoid 14 so as to move it into the energized position. Slot 20 in screw 18 is preferably sized to take a coin or similar thin rigid article for turning. Slot 21 in body 15 is positioned to correspond with slot 20 in the override position. Thus a coin that will engage both slots will secure manual override 18 in override position.

Body 15 terminates in baseplate 22 and retainer 16 secures baseplate 22 against actuator 11 by means of bolts 24. Interface plate 25 contains channels enabling rotation of body 15 as will be described below. Plate 25 faces baseplate 22 on one side and gasket 27 on the other. Gasket 27 and lower plate 28 form coupling adapter 26 allowing reversal of connections as will be described below. Lower plate 28 connects to actuator 11 preferably with a sealing gasket. Interface plate 25 and coupling adapter 26 together form a coupling interface. Additional description of actuator 11 and ball valve 12 can be found in U.S. Pat. No. 4,046,350 assigned to the present assignee.

Figure 3:
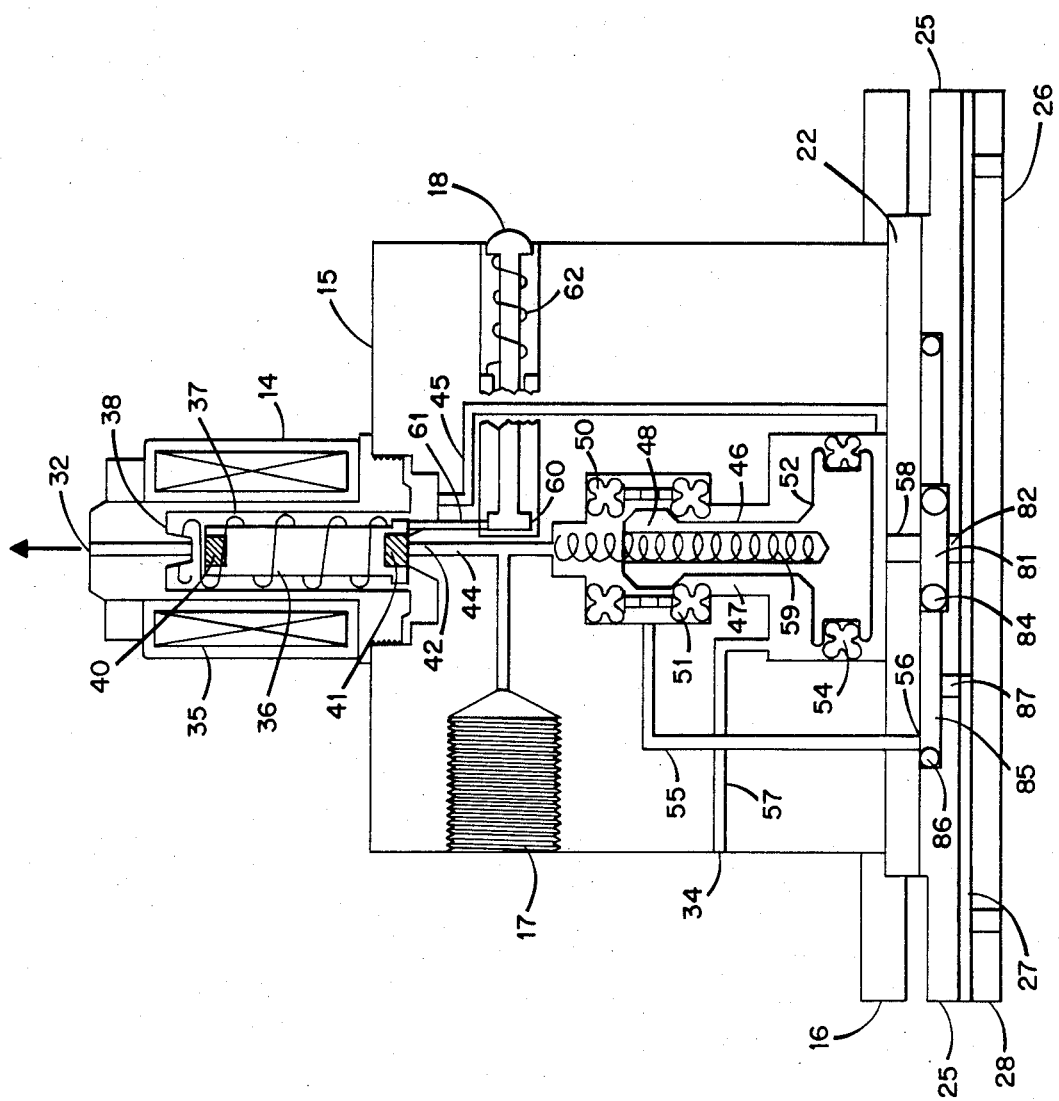
FIG. 3 is a diagramatic illustration of the pilot valve assembly of the invention.

A diagram of the pilot valve assembly is given in FIG. 3 for full understanding of the invention. Solenoid 14 has coil 35 surrounding armature 36 in the usual manner. Helical spring 37 around armature 36 normally forces armature 36 to the deenergized position (down). Aperture 32 in the upper end of solenoid 14 terminates in nozzle 38. Resilient pad 40 in the top of armature 36 faces nozzle 38. Resilient pad 41 in the bottom of armature 36 closes connection 42 connecting inlet passage 44 to first operating passage 45. Inlet passage 44 connects to inlet 17 and passage 45 connects to the interior space of solenoid 14.

Servo piston 46 is mounted in central cavity 47 in body 15. Piston 46 has upper lobe 48 operating between two annular seals, 50 and 51. Larger lower lobe 52 has a third annular seal, 54, mounted as a piston ring. In between seals 50 and 51, second operating passage 55 connects cavity 47 to aperture 56 in baseplate 22. Between seal 51 and seal 54, vent passage 57 connects cavity 47 to vent hole 34. Aperture 58, centrally located in baseplate 22 connects to cavity 47 on the opposite side of seal 54 from where passage 57 is connected. Helical spring 59 mounted axially in piston 46 and bearing against the top of cavity 47, maintains piston 46 normally with upper lobe 48 bearing against lower annular seal 51. Inlet passage 44 additionally connects to the top of cavity 47 and first operating passage 45 connects to cavity 47 adjacent to baseplate 22.

Override screw 18 terminates in cam lever 60 operating against extension 61 from armature 36. Helical spring 62 normally returns screw 18 to the nonoverride position.

In operation there is normally fluid pressure, i.e. air, at inlet 17. The air is blocked by pad 41 of armature 36 and is directed down into cavity 47, past seal 50, through passage 55 and out baseplate 22 to actuator 11. Fluid from actuator 11 passes through aperture 58, passage 45 and solenoid 14 to exhaust at vent 32. When the solenoid is energized, aperture 32 is blocked at nozzle 38 and connection 42 is opened allowing fluid to pass from inlet passage 44 to passage 45 and out aperture 58 to actuator 11. Since this passage passes under piston 46, the piston is pushed up against spring 50 so that lobe 48 bears against seal 50 blocking inlet fluid. At the same time, exhaust fluid from actuator 11 is allowed to pass through aperture 56, passage 55, cavity 47 and out through vent 34. Thus pressure and exhaust to actuator 11 are reversed by energizing solenoid 14.

Override screw 18 forces armature 36 to the energized position having the same effect as energizing the solenoid.

Coupling adapter 26 is shown exploded in FIG. 4 and diagramatically in FIG. 3. It consists of lower plate 28 and gasket 27. Interface plate 25 is likewise shown in the two figures. Plate 25 has 6 bolt apertures 70. Plate 28 has matching apertures 71 plus apertures 72 and 74 which are for fluid passage to actuator 11. Plate 25 also has aperture 75 matching pin in plate 28. Gasket 27 has apertures matching the bolt apertures and short and long elongated apertures 77 and 78. Aperture 80 in gasket 27 has a matching aperture on the opposite side (not shown) whereby gasket 27 can be rotated 180° with respect to plate 25 but plate 28 cannot.

Interfacial plate 25 has circular recessed channel 81 in its center with central aperture 82 passing through the recess and out to aperture 78 in gasket 27. Annular seal 84 such as an O-ring bounds the edge of channel 81. Annular channel 85 concentric with channel 81 is also recessed in plate 25 and is bounded by annular seal 86 which may also be an O-ring. Aperture 87 passes through plate 25 in channel 85 and out to aperture 77.

Referring to FIG. 1, baseplate 22 extends beyond body 15, but inside bolts 24 providing a flange. Body 15 is cylindrical so that it may be rotated freely with bolts 24 loosened. Due to channels 81 and 85, fluid passages are connected through to apertures 82 and 87 to matter what position of rotation is used. Gasket 27 has been made of neoprene impregnated cloth. A thickness of 1 mm for gasket 27 is sufficient for providing the passages for most actuators. The thickness can be greater as required.

Rotation of gasket 27 by 180° reverses the connections to the actuator so that a normally closed condition can be changed to a normally open position by rotating gasket 27. Indicia 31 on gasket 27 indicate its position as shown in FIG. 2. Cutout notch 30 in retainer plate 16 and baseplate 25 exposes indicia 31.

While the invention has been described with respect to a specific embodiment, variations are contemplated as within the scope of the invention as set forth in the following claims.

We claim:

1. A solenoid operated pilot valve assembly (10) having at least one inlet connection (17) for receiving fluid under pressure, at least one outlet for fluid exhaust (32 and/or 34), a coupling interface (25, 27, 28) for connecting at least two passages (45, 55) from said pilot valve assembly (10) to a fluid pressure driven actuator (11), a solenoid armature (36) for reversibly connecting said inlet and said outlet to respective ones of said two passages, said coupling interface comprising an interface element (25) having concentric channels (81, 85) providing the connecting for said two passages, annular seals (84, 86) separating said concentric channels, a plate (28) containing two apertures (72, 74) for connecting said concentric channels to fluid path apertures in a driven actuator (11), a gasket (27) between said plate (28) and said interface element (25), said gasket having a first flot aperture (77) that extends from one of the two apertures in said plate to an aperture (87) connected to an outer concentric channel (85) of said interface element and a second slot aperture (78) that extends from the other of said two apertures in said plate to an aperture (82) connected to central channel (81) of said interface element such that 180 degree reversal of said gasket (27) reverses the connections of said concentric channels while simultaneously exposing marking indicia designating its orientation and selectively exposed by said orientation.

2. In a solenoid operated pilot valve assembly according to claim 1, the improvement wherein said actuator is a valve actuator coupled to and driving a valve.

3. In a solenoid operated pilot valve assembly according to claim 2, the improvement wherein said valve actuator is coupled to and driving a ball valve.

4. In a solenoid operated pilot valve assembly having at least one inlet connection for receiving fluid under pressure, at least one outlet for fluid exhaust, a coupling interface for connecting at least two passages from said pilot valve assembly to a fluid pressure driven actuator, a pilot valve for reversibly connecting said inlet and said outlet to respective ones of said two passages and a spring return manual override for forcing the pilot valve into the energized position, the improvement in said manual override comprising a slot in said manual override for operation by a thin metal article and a corresponding slot in the adjacent body of said assembly whereby a thin metal article may rotate the manual override into the override position and secure it in that position by connecting with the corresponding slot.

5. A solenoid operated pilot valve assembly comprising:
   (a) at least one inlet connection (17) for receiving fluid under pressure;
   (b) at least one outlet (32 and/or 34) for fluid exhasut;
   (c) a first operating passage (45);
   (d) a second operating passage (55);
   (e) a coupling interface (25, 27, 28) connected to said first operating passage and said second operating passage for coupling to a fluid pressure driven actuator (11);
   (f) a spring-loaded solenoid armature (36) having first sealing means (40) at one end for closing a connecting passage between said first operating passage and said one outlet (32) and a second sealing means (41) at a second end for closing a connecting passage between said first operating passage and said inlet (17);
   (g) a spring loaded servo piston (46) having a lobe (48) bearing against a third sealing means (50) for blocking a connecting passage between said second operating passage and said inlet, and bearing against a fourth sealing means (51) for blocking a connecting passage between said second operating passage and said outlet (34), said coupling interface including an inner channel (81) connecting to said first operating passage and an outer channel (85) concentric with said inner channel connecting to said second operating passage, all whereby fluid pressure to a driven actuator can be supplied through one passage and exhausted through a second passage then, by operation of a single solenoid, reversed so that its exhaust is through the first passage and supply is through the second.

6. A solenoid operated pilot valve assembly according to claim 5 further comprising a second lobe (52) to said servo piston, said second lobe being a piston element exposed to the first operating passage (45) whereby when the first operating passage holds supply pressure from said inlet (17), said pressure moves said piston (46) against its spring to provide servo action transferring contact from said fourth seal to said third seal.

* * * * *